United States Patent
Collins et al.

(10) Patent No.: US 10,454,786 B2
(45) Date of Patent: Oct. 22, 2019

(54) MULTI-PARTY UPDATES TO DISTRIBUTED SYSTEMS

(71) Applicant: Amazon Technologies, Inc., Seattle, WA (US)

(72) Inventors: Brian Collins, Seattle, WA (US); Zachary Mohamed Shalla, Seattle, WA (US); Marvin Michael Theimer, Seattle, WA (US); John Petry, Seattle, WA (US); Michael Hart, Seattle, WA (US); Serge Hairanian, Newcastle, WA (US); Anders Samuelsson, Redmond, WA (US); Salvador Salazar Sepulveda, Seattle, WA (US); Ji Luo, Seattle, WA (US)

(73) Assignee: Amazon Technologies, Inc., Seattle, WA (US)

(*) Notice: Subject to any disclaimer, the term of this patent is extended or adjusted under 35 U.S.C. 154(b) by 215 days.

(21) Appl. No.: 15/276,711

(22) Filed: Sep. 26, 2016

(65) Prior Publication Data

US 2018/0091583 A1     Mar. 29, 2018

(51) Int. Cl.
*H04L 12/24* (2006.01)
*H04L 29/08* (2006.01)
*H04L 29/06* (2006.01)

(52) U.S. Cl.
CPC ...... *H04L 41/5003* (2013.01); *H04L 41/0813* (2013.01); *H04L 41/28* (2013.01);
(Continued)

(58) Field of Classification Search
CPC ... H04L 63/08; H04L 63/0435; H04L 63/061; H04L 63/0876; H04L 63/105; H04L 63/205; H04L 9/3255; H04L 51/12; H04L 63/10; H04L 63/102; H04L 63/20; H04L 67/02; H04L 67/104; H04L 67/1046; H04L 67/1059; H04L 67/1068; H04L 67/1095;
(Continued)

(56) References Cited

U.S. PATENT DOCUMENTS 6,311,192 B1    10/2001    Rosenthal et al.
6,832,202 B1    12/2004    Schuyler et al.
(Continued)

OTHER PUBLICATIONS

Markus Vilcinskas, "What is Azure Active Directory?", Retrieved from URL: https://azure.microsoft.com/en-us/documentation/articles/active-directory-whatis/, Updated Aug. 23, 2016, pp. 1-4.

*Primary Examiner* — Djenane M Bayard
(74) *Attorney, Agent, or Firm* — Robert C. Kowert; Meyertons, Hood, Kivlin, Kowert & Goetzel, P.C.

(57) ABSTRACT

Multi-party updates may be performed for distributed systems. An agreement request may be received that proposes updates to a distributed system. An authorization scheme for the agreement request may be determined and approvers for the proposed updates identified according to the authorization scheme. Notifications may be provided to the approvers indicating the proposed updates to the distributed system. Responses from the approvers may be evaluated to determine whether the authorization scheme is satisfied for the proposed updates. If the authorizations scheme is satisfied, then the proposed updates may be performed to the distributed system.

20 Claims, 9 Drawing Sheets

(52) U.S. Cl.
CPC .......... *H04L 63/20* (2013.01); *H04L 67/1097* (2013.01); *H04L 67/30* (2013.01)

(58) Field of Classification Search
CPC ... H04L 67/325; H04L 9/085; H04L 2209/60; H04L 2209/805; H04L 41/5003; H04L 45/7453; H04L 51/04; H04L 12/437; H04L 12/4625; H04L 12/4637; H04L 12/42; H04L 12/422; H04L 45/18; H04L 45/22; H04L 45/50; H04L 12/427; H04L 12/433; H04L 12/5601; H04L 2012/5612; H04L 2012/5618; H04L 2012/5627; H04L 2012/5638; H04L 2012/5656
See application file for complete search history.

(56) References Cited

U.S. PATENT DOCUMENTS

| | | | |
|---|---|---|---|
| 6,996,601 B1 | 2/2006 | Smith | |
| 7,131,071 B2 | 10/2006 | Gune et al. | |
| 7,379,931 B2 | 5/2008 | Morinville | |
| 2007/0156849 A1* | 7/2007 | Becker | G06F 8/65 709/219 |
| 2012/0311672 A1* | 12/2012 | Connor | G06F 21/604 726/4 |
| 2013/0036102 A1* | 2/2013 | Goyal | G06N 5/02 707/694 |
| 2017/0123663 A1* | 5/2017 | Panasko | G06F 3/0659 |

* cited by examiner

MULTI-PARTY UPDATES TO DISTRIBUTED SYSTEMS

BACKGROUND

Large systems with many users often require complex management schemes in order to ensure that both users and system components are appropriately utilized for performing operations. Instead of reconfiguring or redesigning system components each time changes in the appropriate actions or behaviors taken by system components on behalf of users are to be implemented, resource management systems have been developed to allow for the separate management of actions and behaviors that may be performed by system components. Access privileges, for instance, may be defined for one or multiple users with respect to certain system components in a resource management system so that when access requests from the users directed to the certain system components are received, the resource management system may indicate to the system components which requests may or not be performed based on the defined access privileges. In this way, resource management systems reduce the costs associated with modifying or enforcing actions or behaviors of system components by reducing the number of changes that have to be implemented directly at system components. However, as the size of systems continues to increase, the ability of resource management systems to cope with growing numbers of system components in order to define and apply appropriate actions or behaviors for the system components may become less efficient without further capabilities to optimally manage system components.

Figure 1:
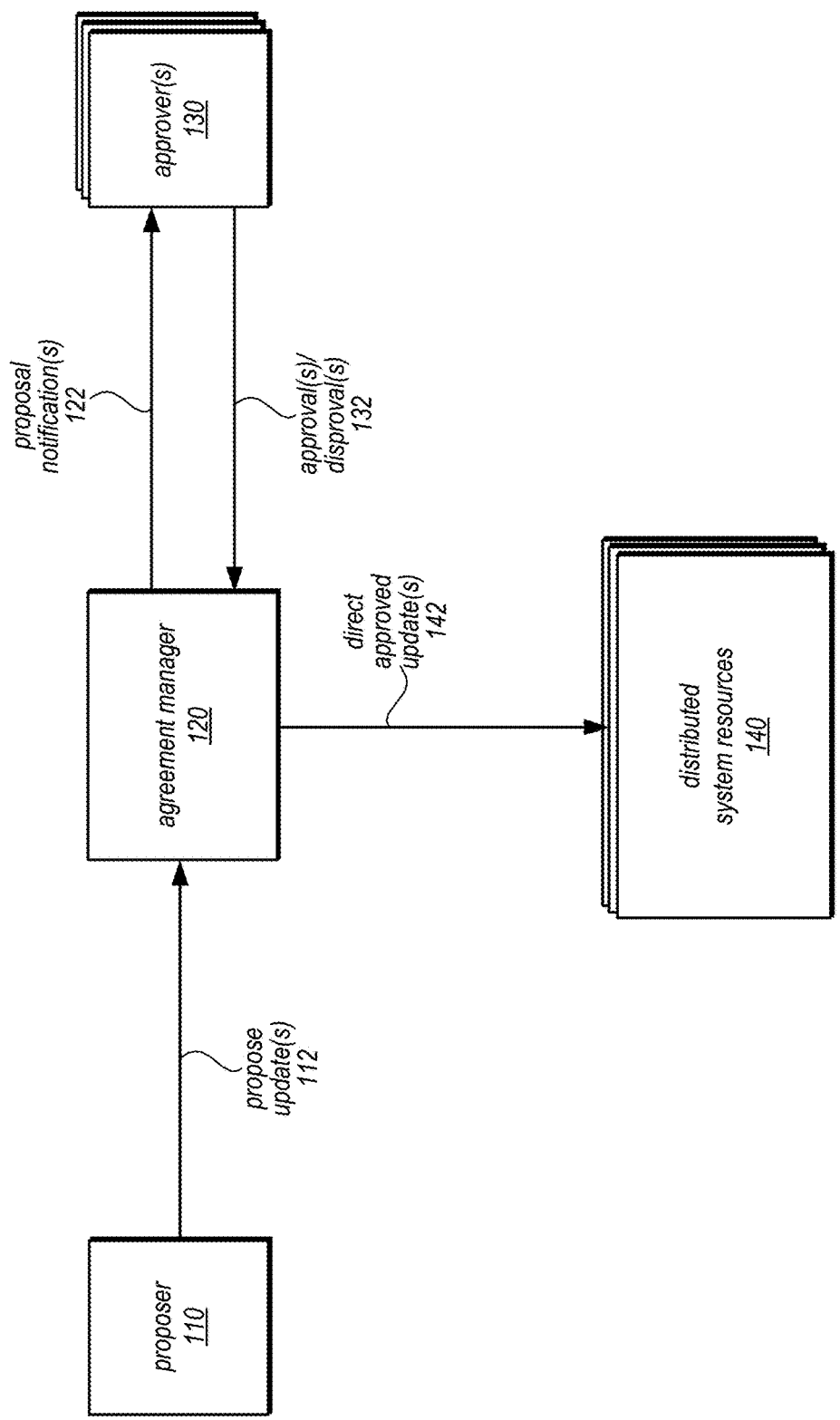
FIG. 1 is a logical block diagram illustrating multi-party updates to a distributed system, according to some embodiments.

While embodiments are described herein by way of example for several embodiments and illustrative drawings, those skilled in the art will recognize that the embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). The words "include," "including," and "includes" indicate open-ended relationships and therefore mean including, but not limited to. Similarly, the words "have," "having," and "has" also indicate open-ended relationships, and thus mean having, but not limited to. The terms "first," "second," "third," and so forth as used herein are used as labels for nouns that they precede, and do not imply any type of ordering (e.g., spatial, temporal, logical, etc.) unless such an ordering is otherwise explicitly indicated.

Various components may be described as "configured to" perform a task or tasks. In such contexts, "configured to" is a broad recitation generally meaning "having structure that" performs the task or tasks during operation. As such, the component can be configured to perform the task even when the component is not currently performing that task (e.g., a computer system may be configured to perform operations even when the operations are not currently being performed). In some contexts, "configured to" may be a broad recitation of structure generally meaning "having circuitry that" performs the task or tasks during operation. As such, the component can be configured to perform the task even when the component is not currently on. In general, the circuitry that forms the structure corresponding to "configured to" may include hardware circuits.

Various components may be described as performing a task or tasks, for convenience in the description. Such descriptions should be interpreted as including the phrase "configured to." Reciting a component that is configured to perform one or more tasks is expressly intended not to invoke 35 U.S.C. § 112(f), interpretation for that component.

"Based On." As used herein, this term is used to describe one or more factors that affect a determination. This term does not foreclose additional factors that may affect a determination. That is, a determination may be solely based on those factors or based, at least in part, on those factors. Consider the phrase "determine A based on B." While B may be a factor that affects the determination of A, such a phrase does not foreclose the determination of A from also being based on C. In other instances, A may be determined based solely on B.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

DETAILED DESCRIPTION

Various embodiments of multi-party updates to a distributed system are described herein. Distributed systems include multiple different resources (e.g., both physical and virtual) that provide various different services, capabilities, and/or functionalities, typically on behalf of multiple different entities. When changes to the distributed system are desired, it is likely that the changes may affect the way in which the distributed system operates for several of the entities that utilize the distributed system. In order to make the desired changes, approval may be beneficial (or required) so that changes to the distributed system are not made without some notification of the changes to other entities that may be affected. For example, management decisions regarding various resources in a distributed system often involves defining and enforcing the permitted actions, configurations, controls or any other definition of behaviors for the system resources. Security policies, such as access rights or permitted actions for system resources, for instance, may be defined and enforced for users of the system resources. When making decisions to change the permitted actions, configurations, controls or any other definition of behaviors for the system resources in a distributed system, approval from more than the proposing entity may be desirable.

While manual and/or informal approval mechanisms to effect changes to a distributed system can be implemented, these approval mechanisms are unable to scale for large distributed systems. For example, large scale distributed systems implementing thousands or hundreds of thousands of resources on behalf of thousands or hundreds of thousands of users, clients, or entities may make it difficult to discover, track, and obtain the approval of changes that may need to be made to a distributed system. Implementing multi-party updates for a distributed system as discussed below, however, may coordinate the proposal, approval, and performance of updates to a distributed system in a scalable, traceable, and automated fashion.

FIG. 1 is a logical block diagram illustrating multi-party updates to a distributed system, according to some embodiments. Proposer 110 may submit proposed updates 112 to agreement manager 120. The proposed updates may include any updates or changes to distributed system resources 140 (e.g., hardware resources, such as various processing, storage, and/or networking hardware) or virtual resources (e.g., instances, volumes, user accounts, or control policies). The proposed updates 112 may be included in a request to agreement manager 120 as executable instructions (e.g., API requests or executable scripts, code, or other executable data objects). Agreement manager 120 may determine an authorization scheme (e.g., a handshake mechanism) for approving the proposed updates. An authorization scheme may be defined to include one or multiple satisfaction criteria for determining whether the proposed updates 112 are approved. The authorization scheme may also include the identity of approvers (e.g., by identifying user account names or other user account identifiers), or a mechanism for determining approvers (e.g., by identifying user account types or groups that include user accounts any of which may act as an approver). For example, proposer 110 may submit an authorization scheme as part of proposal 112 that identifies specific approvers 130 (e.g., user accounts or other identities of stakeholders) to approve the proposed update(s) 112.

Agreement manager 120 may send proposal notification(s) 122 to the identified approver(s) 130. In turn, approvers 130 may send a response indicating approval(s) or disapproval(s) 132 to agreement manager. Agreement manager 120 may evaluate the responses with respect to the authorization scheme. For example, if the authorization scheme requires that 4 of 6 approver(s) 130 send an approval response, then agreement manager 120 may determine whether 4 approval responses were received. If not, then agreement manager 120 may send a rejection of the proposed amendments (not illustrated). If, however the authorization scheme for the proposed update(s) 112 is satisfied, then agreement manager 120 may direct the approved update(s) 142 with respect to distributed system resources 140. For example, agreement manager 120 may send the API requests corresponding to the described updates (e.g., specified by a user in proposed updates 112) to initiate performance of the updates, or execute a script or executable data object to perform the updates.

Please note, FIG. 1 is provided as a logical illustration of multi-party updates to a distributed system, and is not intended to be limiting as to the physical arrangement, size, or number of components, modules, or devices, implementing a distributed system, proposer 110, agreement manager 120, or approvers 130.

The specification first describes an example of a distributed system, a provider network implementing multiple different resources as part of offering different services to clients of the provider network. The provider network may also implement a resource management service that maintains different hierarchies of resource data objects for managing provider network resources corresponding to the resource data objects, according to various embodiments, including coordination of agreements to perform updates to the provider network amongst multiple user accounts of the provider network. Included in the description of the example resource management service are various aspects of the example resource management service along with the various interactions between the resource management service, other services in the provider network, and clients of the provider network. The specification then describes a flowchart of various embodiments of methods for multi-party updates to a distributed system. Next, the specification describes an example system that may implement the disclosed techniques. Various examples are provided throughout the specification.

Figure 2:
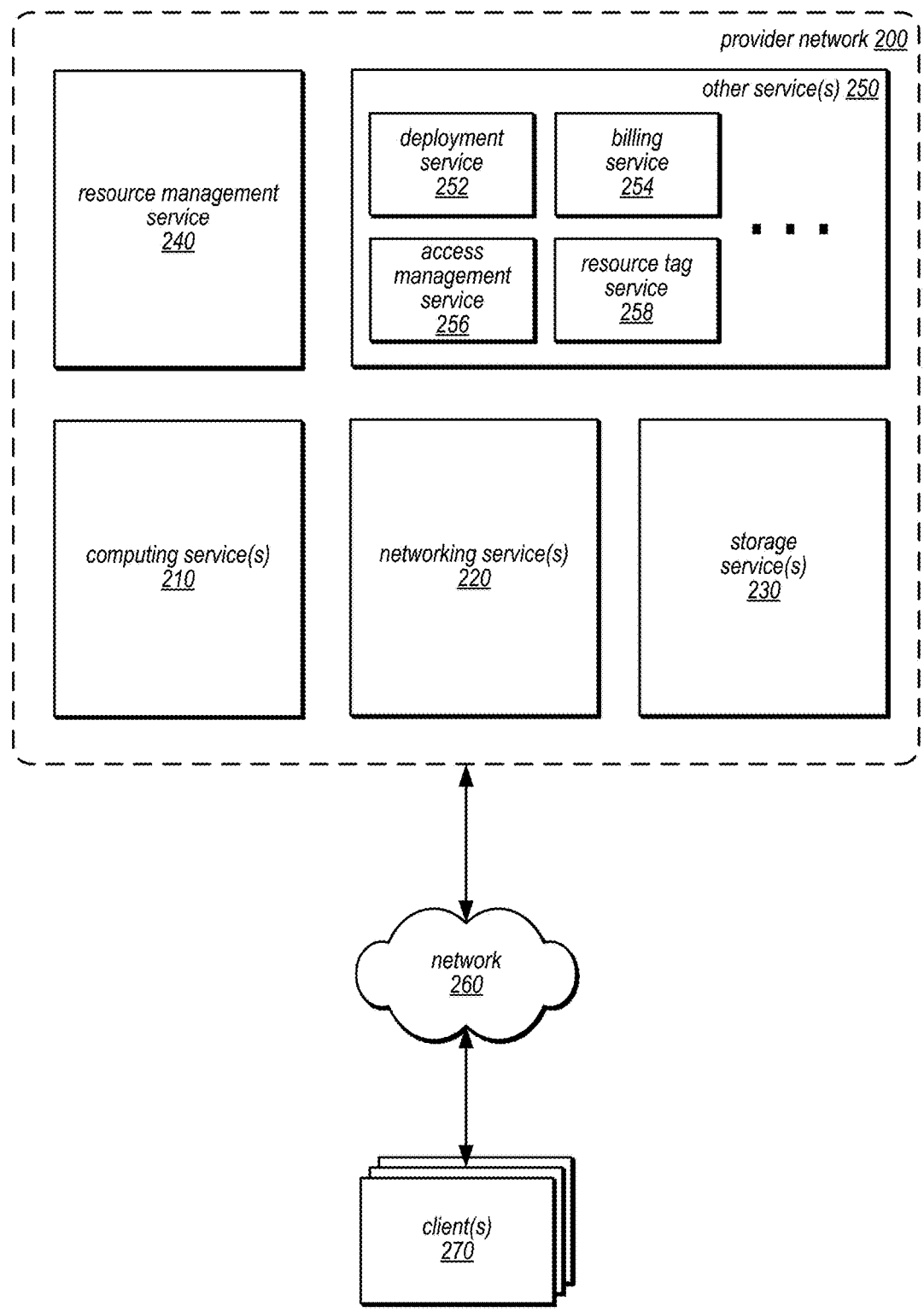
FIG. 2 is a logical block diagram illustrating a provider network that implements a resource management service that provides different hierarchies of resource data objects for managing provider network resources and allows multi-party updates to the different hierarchies, according to some embodiments.

FIG. 2 is a logical block diagram illustrating a provider network that implements a resource management service that provides different hierarchies of resource data objects for managing provider network resources, according to some embodiments. Provider network 200 may be set up by an entity such as a company or a public sector organization to provide one or more services (such as various types of cloud-based computing or storage) accessible via the Internet and/or other networks to clients 270. Provider network 200 may include numerous data centers hosting various resource pools, such as collections of physical and/or virtualized computer servers, storage devices, networking equipment and the like (e.g., computing system 1000 described below with regard to FIG. 9), needed to implement and distribute the infrastructure and services offered by the provider network 200. In some embodiments, provider network 200 may implement computing service(s) 210, networking service(s) 220, storage service(s) 230, resource management service 240 (which is discussed in detail below with regard to FIGS. 3-7), and/or any other type of network based services 250 (which may include various other types of storage, processing, analysis, communication, event handling, visualization, and security services as well as services for operating the services offered by provider network 200, including deployment service 252, billing service 254, access management service 256, and resource tag service 258). Clients 270 may access these various services offered by provider network 200 via network 260. Likewise network-based services may themselves communicate and/or make use of one another to provide different services. For example, various ones of computing service(s) 210, networking service(s) 220, storage service(s) 230, and/or other service(s) 250 may lookup policies applied to resource data objects in different hierarchies maintained as part of resource management service 240 describing resources in the services in order to enforce behaviors, actions, configurations, or controls indicated in the policies.

In various embodiments, the components illustrated in FIG. 2 may be implemented directly within computer hardware, as instructions directly or indirectly executable by computer hardware (e.g., a microprocessor or computer system), or using a combination of these techniques. For example, the components of FIG. 2 may be implemented by a system that includes a number of computing nodes (or simply, nodes), each of which may be similar to the computer system embodiment illustrated in FIG. 9 and described below. In various embodiments, the functionality of a given service system component (e.g., a component of the resource management service or a component of the computing service) may be implemented by a particular node or may be distributed across several nodes. In some embodiments, a given node may implement the functionality of more than one service system component (e.g., more than one storage service system component).

Computing service(s) 210 may provide computing resources to client(s) 270 of provider network 200. These computing resources may in some embodiments be offered to clients in units called "instances," such as virtual or physical compute instances or storage instances. A virtual compute instance may, for example, comprise one or more servers with a specified computational capacity (which may be specified by indicating the type and number of CPUs, the main memory size, and so on) and a specified software stack (e.g., a particular version of an operating system, which may in turn run on top of a hypervisor) or machine image. A number of different types of computing devices may be used singly or in combination to implement compute instances, in different embodiments, including general purpose or special purpose computer servers, storage devices, network devices and the like. In some embodiments clients 270 or other any other user may be configured (and/or authorized) to direct network traffic to a compute instance.

Compute instances may operate or implement a variety of different platforms, such as application server instances, Java™ virtual machines (JVMs), general purpose or special-purpose operating systems, platforms that support various interpreted or compiled programming languages such as Ruby, Perl, Python, C, C++ and the like, or high-performance computing platforms) suitable for performing client 270 applications, without for example requiring the client 270 to access an instance. In some embodiments, compute instances have different types or configurations based on expected uptime ratios. The uptime ratio of a particular compute instance may be defined as the ratio of the amount of time the instance is activated, to the total amount of time for which the instance is reserved. Uptime ratios may also be referred to as utilizations in some implementations. If a client expects to use a compute instance for a relatively small fraction of the time for which the instance is reserved (e.g., 30%-35% of a year-long reservation), the client may decide to reserve the instance as a Low Uptime Ratio instance, and pay a discounted hourly usage fee in accordance with the associated pricing policy. If the client expects to have a steady-state workload that requires an instance to be up most of the time, the client may reserve a High Uptime Ratio instance and potentially pay an even lower hourly usage fee, although in some embodiments the hourly fee may be charged for the entire duration of the reservation, regardless of the actual number of hours of use, in accordance with pricing policy. An option for Medium Uptime Ratio instances, with a corresponding pricing policy, may be supported in some embodiments as well, where the upfront costs and the per-hour costs fall between the corresponding High Uptime Ratio and Low Uptime Ratio costs.

Compute instance configurations may also include compute instances with a general or specific purpose, such as computational workloads for compute intensive applications (e.g., high-traffic web applications, ad serving, batch processing, video encoding, distributed analytics, high-energy physics, genome analysis, and computational fluid dynamics), graphics intensive workloads (e.g., game streaming, 3D application streaming, server-side graphics workloads, rendering, financial modeling, and engineering design), memory intensive workloads (e.g., high performance databases, distributed memory caches, in-memory analytics, genome assembly and analysis), and storage optimized workloads (e.g., data warehousing and cluster file systems). Size of compute instances, such as a particular number of virtual CPU cores, memory, cache, storage, as well as any other performance characteristic. Configurations of compute instances may also include their location, in a particular data center, availability zone, geographic, location, etc. . . . and (in the case of reserved compute instances) reservation term length.

Networking service(s) 220 may implement various networking resources to configure or provide virtual networks, such as virtual private networks (VPNs), among other resources implemented in provider network 200 (e.g., instances of computing service(s) 210 or data stored as part of storage service(s) 230) as well as control access with external systems or devices. For example, networking service(s) 220 may be configured to implement security groups for compute instances in a virtual network. Security groups may enforce one or more network traffic policies for network traffic at members of the security group. Membership in a security group may not be related to physical location or implementation of a compute instance. The number of members or associations with a particular security group may vary and may be configured.

Networking service(s) 220 may manage or configure the internal network for provider network 200 (and thus may be configured for implementing various resources for a client 270). For example, an internal network may utilize IP tunneling technology to provide a mapping and encapsulating system for creating an overlay network on network and may provide a separate namespace for the overlay layer and the internal network layer. Thus, in this example, the IP tunneling technology provides a virtual network topology; the interfaces that are presented to clients 270 may be attached to the overlay network so that when a client 270 provides an IP address that they want to send packets to, the IP address is run in virtual space by communicating with a mapping service (or other component or service not illustrated) that knows where the IP overlay addresses are.

Storage service(s) 230 may be one or more different types of services that implement various storage resources to provide different types of storage. For example, storage service(s) 230 may be an object or key-value data store that provides highly durable storage for large amounts of data organized as data objects. In some embodiments, storage service(s) 230 may include an archive long-term storage solution that is highly-durable, yet not easily accessible, in order to provide low-cost storage. In some embodiments, storage service(s) 230 may provide virtual block storage for other computing devices, such as compute instances implemented as part of virtual computing service 210. For example, a virtual block-based storage service may provide block level storage for storing one or more data volumes mapped to particular clients, providing virtual block-based storage (e.g., hard disk storage or other persistent storage) as a contiguous set of logical blocks. Storage service(s) 230 may replicate stored data across multiple different locations, fault tolerant or availability zones, or nodes in order to provide redundancy for durability and availability for access.

In some embodiments, storage service(s) 230 may include resources implementing many different types of databases and/or database schemas. Relational and non-relational databases may be implemented to store data, as well as row-oriented or column-oriented databases. For example, a database service that stores data according to a data model in which each table maintained on behalf of a client contains one or more items, and each item includes a collection of attributes, such as a key value data store. In such a database, the attributes of an item may be a collection of name-value pairs, in any order, and each attribute in an item may have a name, a type, and a value. Some attributes may be single valued, such that the attribute name is mapped to a single value, while others may be multi-value, such that the attribute name is mapped to two or more values.

In some embodiments, storage service(s) 230 may implement a hierarchical data storage service, such as hierarchical data store 350 in FIG. 3 discussed below. A hierarchical data storage service may store, manage, and maintain hierarchical data structures, such as a directory structure discussed below with regard to FIG. 5. Clients of a hierarchical data storage service may operate on any subset or portion of a hierarchical data structure maintained in the data storage service with transactional semantics and/or may perform path-based traversals of hierarchical data structures. Such features allow clients to access hierarchical data structures in many ways. For instance, clients may utilize transactional access requests to perform multiple operations concurrently, affecting different portions (e.g., nodes) of the hierarchical data structure (e.g., reading parts of the hierarchical data structure, adding a node, and indexing some of the node's attributes, while imposing the requirement that the resulting updates of the operations within the transaction are isolated, consistent, atomic and durably stored). As discussed below, in at least some embodiments, the hierarchical data stored in a hierarchical data storage service may be hierarchies of resource data objects on behalf of resource management service 240.

In various embodiments, provider network 200 may implement various other service(s) 250, including deployment service 252. Deployment service 252 may include resources to instantiate, deploy, and scale other resources (from other network-based service, such as computing service(s) 210, networking service(s) 220, and/or storage service(s) 230) to implement a variety of different services, applications, or systems. For example, deployment service 252 may execute pre-defined deployment schemes which may be configured based, at least in part, on policies applied to resources launched by the deployment service 252 (e.g., a policy that describes the hardware and software configuration of virtual compute instance launched on behalf of particular user account).

Provider network 200 may also implement billing service 254 which may implement components to coordinate the metering and accounting of client usage of network-based services, such as by tracking the identities of requesting clients, the number and/or frequency of client requests, the size of data stored or retrieved on behalf of clients, overall resource bandwidth used by clients, class/type/number of resources requested by clients, or any other measurable client usage parameter. Billing service 254 may maintain a database of usage data that may be queried and processed by external systems for reporting and billing of client usage activity. Similar to deployment service 252, policies applied to resource data objects in hierarchies managed by resource management service 240 may indicate payment accounts, budgets, or responsible parties for which the usage data is to be reported and/or billed.

Provider network may also implement access management service 256, which may implement user authentication and access control procedures defined for different resources (e.g., instances, user accounts, data volumes, etc.) as described by policies applied to resource data objects in hierarchies at resource management service 240. For example, for a given network-based services request to access a particular compute instance, provider network 200 may implement components configured to ascertain whether the client associated with the access is authorized to configure or perform the requested task. Authorization may be determined such as by, for example, evaluating an identity, password or other credential against credentials associated with the resources, or evaluating the requested access to the provider network 200 resource against an access control list for the particular resource. For example, if a client does not have sufficient credentials to access the resource, the request may be rejected, for example by returning a response to the requesting client indicating an error condition.

Provider network 200 may also implement resource tag service 258, which may manage resource attributes for resources of other services (e.g., computing service(s) 210, networking service(s) 220, and/or storage service(s) 230). Resource attributes may be a tag, label, set of metadata, or any other descriptor or information corresponding to a provider network resource, implemented at one of various network-based services of the provider network. Attributes may be represented in various ways, such as a key-value pair, multiple values, or any other arrangement of information descriptive of the resource. Resource attributes for a resource may be maintained as part of resource metadata for the resources at network-based services. Network-based services may create resource metadata and/or attributes when a resource is created by a client. However, a client may wish to modify, remove, and/or add new resources attributes to the resource metadata in order to provide greater flexibility for automating various interactions within the resources utilizing resource metadata. Resource tag service 258 may lookup policies for different resources to determine which resource attributes are to be maintained for the different resources, in some embodiments.

Generally speaking, clients 270 may encompass any type of client configurable to submit network-based services requests to provider network 200 via network 260, including requests for directory services (e.g., an agreement request to proposed updates to a hierarchical data structure to be stored in directory storage service 220, etc.). For example, a given client 270 may include a suitable version of a web browser, or may include a plug-in module or other type of code module configured to execute as an extension to or within an execution environment provided by a web browser. Alternatively, a client 270 may encompass an application such as a database application (or user interface thereof), a media application, an office application or any other application that may make use of persistent storage resources to store and/or access one or more hierarchical data structures to perform techniques like organization management, identity management, or rights/authorization management. In some embodiments, such an application may include sufficient protocol support (e.g., for a suitable version of Hypertext Transfer Protocol (HTTP)) for generating and processing network-based services requests without necessarily implementing full browser support for all types of network-based data. That is, client 270 may be an application configured to interact directly with network-based services platform 200. In some embodiments, client 270 may be configured to generate network-based services requests according to a Representational State Transfer (REST)-style network-based services architecture, a document- or message-based network-based services architecture, or another suitable network-based services architecture.

In some embodiments, a client 270 may be configured to provide access to network-based services to other applications in a manner that is transparent to those applications. For example, client 270 may be configured to integrate with an operating system or file system to provide storage in accordance with a suitable variant of the storage models described herein. However, the operating system or file system may present a different storage interface to applications, such as a conventional file system hierarchy of files, directories and/or folders. In such an embodiment, applications may not need to be modified to make use of the storage system service model. Instead, the details of interfacing to provider network 200 may be coordinated by client 270 and the operating system or file system on behalf of applications executing within the operating system environment.

Clients 270 may convey network-based services requests (e.g., access requests directed to hierarchies in resource management service 240) to and receive responses from network-based services platform 200 via network 260. In various embodiments, network 260 may encompass any suitable combination of networking hardware and protocols necessary to establish network-based-based communications between clients 270 and platform 200. For example, network 260 may generally encompass the various telecommunications networks and service providers that collectively implement the Internet. Network 260 may also include private networks such as local area networks (LANs) or wide area networks (WANs) as well as public or private wireless networks. For example, both a given client 270 and network-based services platform 200 may be respectively provisioned within enterprises having their own internal networks. In such an embodiment, network 260 may include the hardware (e.g., modems, routers, switches, load balancers, proxy servers, etc.) and software (e.g., protocol stacks, accounting software, firewall/security software, etc.) necessary to establish a networking link between given client 270 and the Internet as well as between the Internet and network-based services platform 200. It is noted that in some embodiments, clients 270 may communicate with network-based services platform 200 using a private network rather than the public Internet.

Figure 3:
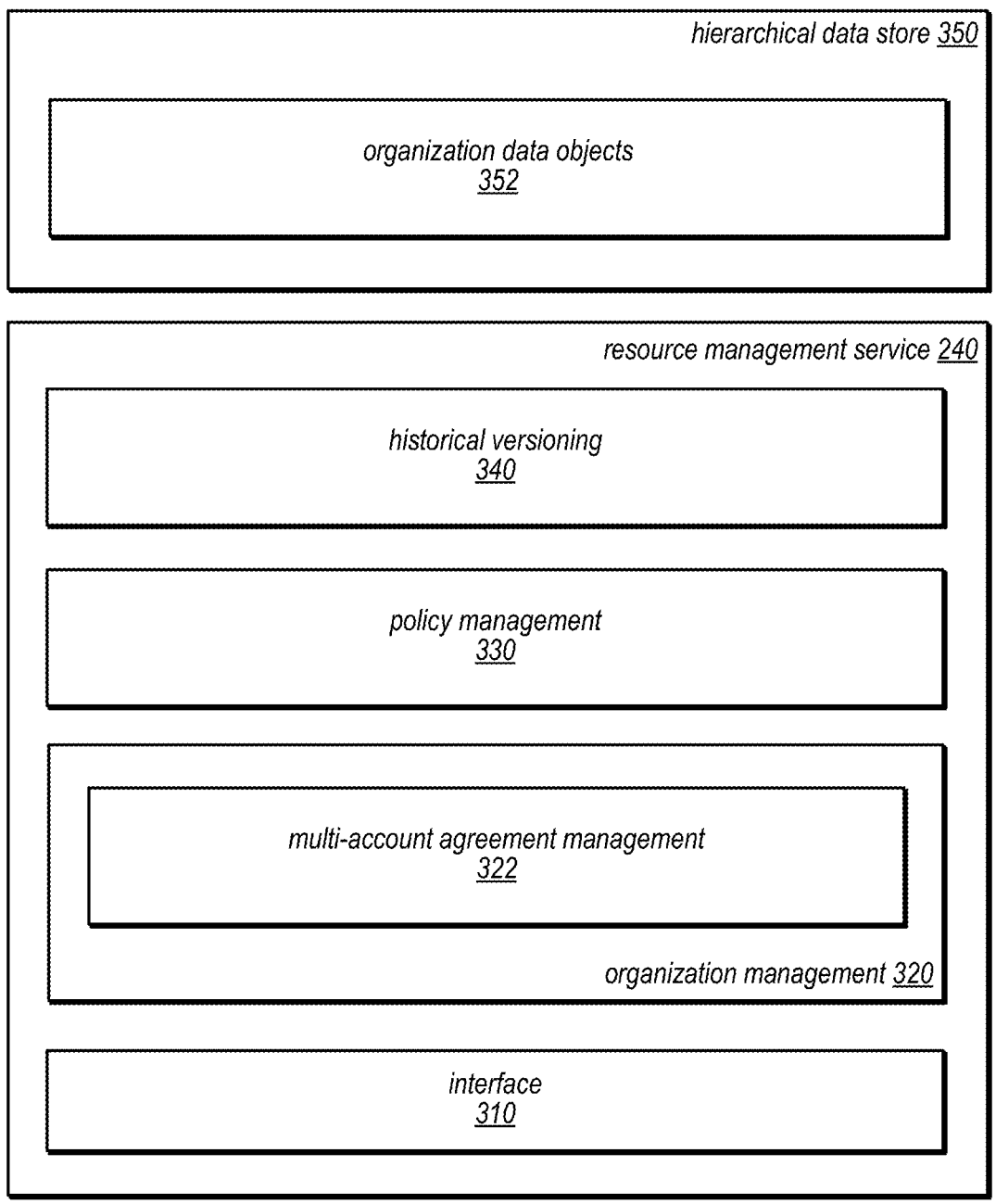
FIG. 3 is a logical block diagram illustrating a resource management service and a hierarchical data store, according to some embodiments.

FIG. 3 is a logical block diagram illustrating a resource management service and a hierarchical data store, according to some embodiments. Resource management service 240 may manage the application of policies to resource data objects for resources in provider network 200. As provider network 200 may offer services to a variety of different customers, a collection or set of resource data objects that are managed together may identified as an organization (although various other terms including entity, domain, or any other identifier for the collection of resource data objects may also be used). Resource management service 240 may provide various capabilities to clients of resource management service 240 to create and manage respective organizations which includes the resource data objects describing the resources of provider network 200 which are associated with one or more customers of the provider network, including managing which resource data objects (and thus their corresponding resources) are members of an organization). Resource management service 240 may allow for the creation and management of multiple different hierarchies of the resources in an organization. These resources may be further subdivided and assigned into groups (which also may be subdomains, directories, sub-entities, sets, etc.). Groups may consist of any resource that can have a policy applied to it. Resource management service 240 may allow clients to author policies and apply them to the organization, to different groups, or directly to resource data objects. In various embodiments, clients may be able to request multi-party agreements to perform updates to an organization and/or resources in the provider network managed by the organization.

Resource management service 240 may implement interface 310, which may provide a programmatic and/or graphical user interface for clients to request the performance of various operations for managing system resources via an organization. For example, the various requests to proposed agreement requests of updates to an organization to other user account(s), as described below with regard to FIG. 6, may be formatted according to an Application Programming Interface (API) and submitted via a command line interface or a network-based site interface (e.g., website interface). Other requests that may be submitted via interface 310 may be requests to create an organization, update an organization (e.g., by adding other resources, inviting other user accounts to join the organization. In some embodiments, an organization may be treated as a resource owned or controlled by the user account that created it, and that account by default may have access permissions to the organization. The user account could then delegate permissions to other user accounts or users using cross-account access or transfer ownership of the organization, in cases where control needs to move to a delegated group or the owner needs to leave the organization.

Resource management service 240 may implement organization management 320, which may handle the creation of organizations, the updates to or modifications of organizations, the delegation of access permissions to organizations, as well as the arrangement of resource data objects within hierarchies maintained for the organization. For example, upon creation an organization may include a single hierarchy providing an arrangement of resource data objects (e.g., as members of various groups and/or groups within groups, etc.). Resource management 320 may handle the various requests to create additional hierarchies, update hierarchies, or delete hierarchies. Organization management 320 may also handle requests to add resource data objects to an organization. For example, organization management may identify which hierarchies a new resource data object should be added to and the location within the hierarchy that the resource data object should be added. In at least some embodiments, organization management may coordinate organization changes between multiple parties, such as adding user accounts to or removing user accounts from an organization and may implement multiparty agreement mechanisms to approve the change to the organization, implementing multi-account agreement management 322. For example, multi-account agreement management 322 may facilitate an authenticated 2-way handshake mechanism to confirm or deny a potential change to an organization. Multi-account agreement management 322 may expose different mechanisms for multiparty agreements, as discussed below with regard to FIGS. 6-8, including emailed invitations, single use tokens, and shared secrets (domains/passwords). When agreement is confirmed, organization management 320 may then perform the agreed upon changes to the organization. Multi-account agreement management 322 may maintain state information and other tracking information to track the progress and approval or disapproval of proposed updates via agreement requests, as discussed below with regard to FIGS. 6-7.

As noted above, policies may be authored or defined and then applied to various resource data objects, groups, or an entire hierarchy of an organization. Resource management service 240 may implement policy management 330 to handle the authoring of policies as well as the application of policies. Many different types of policies may be applied in order to define different types of behaviors. Some policy types, for instance, may be related to specific behaviors, resources, or actors. Billing related policies, for instance, may have one or various types of billing policies. Resource configuration policy types (e.g., configuring operational configuration of resources, when deployed by deployment service 252 for instance. Some policy types can define access controls to resources. Policy management 330 may handle various requests to create instance of policy types, define policy types by authoring a policy schema, and the application of policies to resource data objects, groups, or entire hierarchies within an organization. Multi-account agreement management 322 may coordinate updates that include policy creation, application, removal, and or various other features noted above as part of agreement requests.

Policy management 330 may also handle lookup requests for resource data objects, groups, or organizations and perform policy application and conflict resolutions. For example, policies can also be inherited in a chain from the organization down to a group, group of groups, or individual resource data object. If a policy is applied to a parent node in the hierarchy, then the child node (group, group of groups, or individual resource data object) may inherit the policy of the parent node. In this way, the policy applied to the parent node becomes the "default" policy, in the absence of any other policy applications. When there are multiple policies in the inheritance path, for example there is a policy applied at both the hierarchy and group level, then different policies may have different inheritance semantics, which may have to be resolved. In one scenario, access policies may follow the semantics of a set union, where ordering does not matter (e.g., everything is allowed unless explicitly excluded). Billing policies, in another scenario, may implement a "child wins/parent appends" inheritance model where a child policy may be executed, followed by a parent policy. In such scenarios, ordering of policies matters. Thus, policy application 330 may be configured to resolve conflicting policies according to the appropriate inheritance semantics for the policy.

In at least some embodiments, policy management 330 may implement policy validation (although in alternative embodiments validation may be delegated in part or in total to other components). Validation of policies may include syntax validation. Syntax validation checks policies instances of policy types that are authored to determine whether the policy instance is syntactically correct so that the policy can be parsed and evaluated by backend systems that lookup the policy. Syntactic validation may be performed, in some embodiments, when authored. In addition to syntactic validation, some policies may undergo semantic validation. Semantic validation may be performed to ensure that a resource or other information specified in a policy results in a policy that can be enforced. For example, semantic validation could determine whether an AccountId specified in a payer policy is an account in the organization that has a valid payment instrument. In addition to semantically validating the policies themselves, policy management 330 may validate policy applications and organization changes, in order to ensure that the changes do not invalidate policies that are applied within the organization. For example, validation of changes to ensure that a payer for an organization doesn't leave the organization. As each policy may have different semantic validation logic, each policy may have a separately configurable semantic validator.

Resource management service 240 may implement historical versioning of hierarchies in organizations, in some embodiments. Some services, such as billing service 254, may require the ability to query for historically versioned data, such as which account was the payer of the organization at the end of the previous month (as the current payer may be different due to a change to a hierarchy). In order to provide historical versions of hierarchies (including the policies applied and resource data objects arranged), historical versioning 340 may store prior versions or track or record changes to hierarchies. These prior versions or changes may be associated with particular points in time (e.g., by assigning timestamps). Historical versioning 340 may handle requests for policy lookups across particular ranges of time or at particular points in time. Historical versioning 340 may access the versioned data and return the appropriate policies for the specified time(s). Hierarchy versions may be stored as part of organization data objects 352 in hierarchical data store 350, in some embodiments.

Hierarchical data store 360 may provide data storage for organization data objects 362, including the resource data objects, policy data objects, and any other data describing the organization, including the multiple hierarchies of the resource data objects, as discussed below with regard to FIG. 5. The organization data objects 352 may be maintained within a single hierarchical data structure, though different hierarchies of resource data objects within the single hierarchical data structure may be provided for managing resource data objects, as discussed below with regard to FIG. 5.

Figure 4:
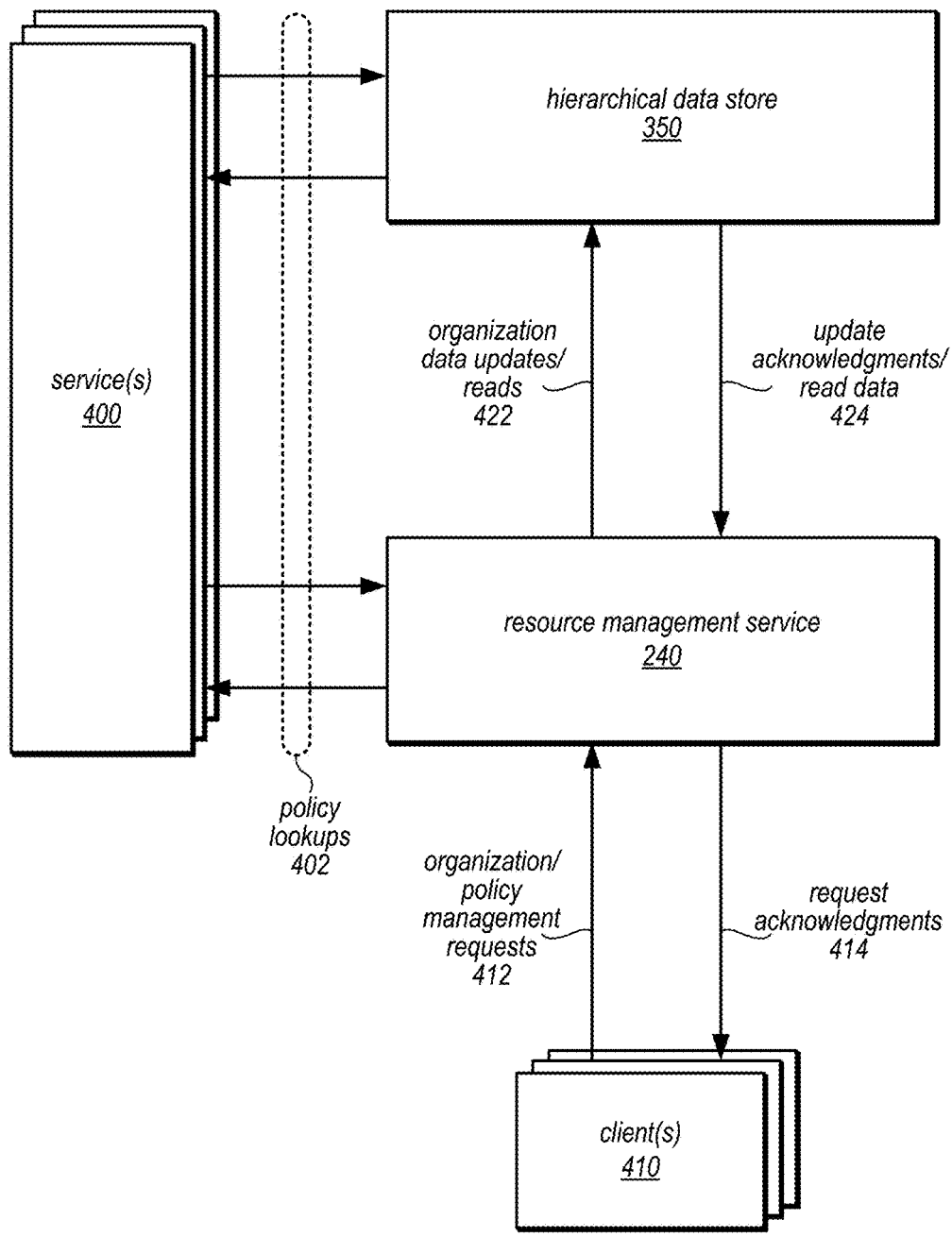
FIG. 4 is a logical block diagram illustrating interactions between clients and a resource management service and between a resource management service and other services, according to some embodiments.

FIG. 4 is a logical block diagram illustrating interactions between clients and a resource management service and between a resource management service and other services, according to some embodiments. As noted above, clients may interact with resource management service 240 to manage resources. For example, client(s) 410 may submit various organization/policy management requests 412 (e.g., to modify a hierarchy by arranging resource data objects or applying/removing policies). In turn resource management service 240, may identify the appropriate updates to organization data to be made or to be read, and send organization data updates/reads 422 to hierarchical data storage 350. Hierarchical data storage 350 may execute the received requests to change hierarchical data structures storing the organization data objects in accordance with the update request or retrieve the appropriate data read from the organization data objects according to the hierarchies, and return update acknowledgements/read data 424 to resource management service 240. In turn, resource management service 240 may return the appropriate acknowledgments (e.g., indicating success or failure of the requests.

Service(s) 400 may perform policy lookups 402 with respect to resource data objects corresponding to resources under the control or responsibility of service(s) 400, in various embodiments. For example, an access control service, such as access management service 256, may lookup the access policies for a particular resource (e.g., compute instance or user account) in order to permit or deny an access request. When launching new resources, network configuration information may be maintained in a policy that is applicable to the launched resource and may be retrieved by a policy lookup 402 from a service 400. Policy lookups 402 may be requested via resource management service 240 or, in some embodiments, may be requested directly from the service to the hierarchical data store 350. Latency sensitive services, for instance, may implement local libraries, agents, or interpreters for the organization data maintained at hierarchical data store 350 in order to reduce the number of requests that have to be sent in order to perform a policy lookup.

Figure 5:
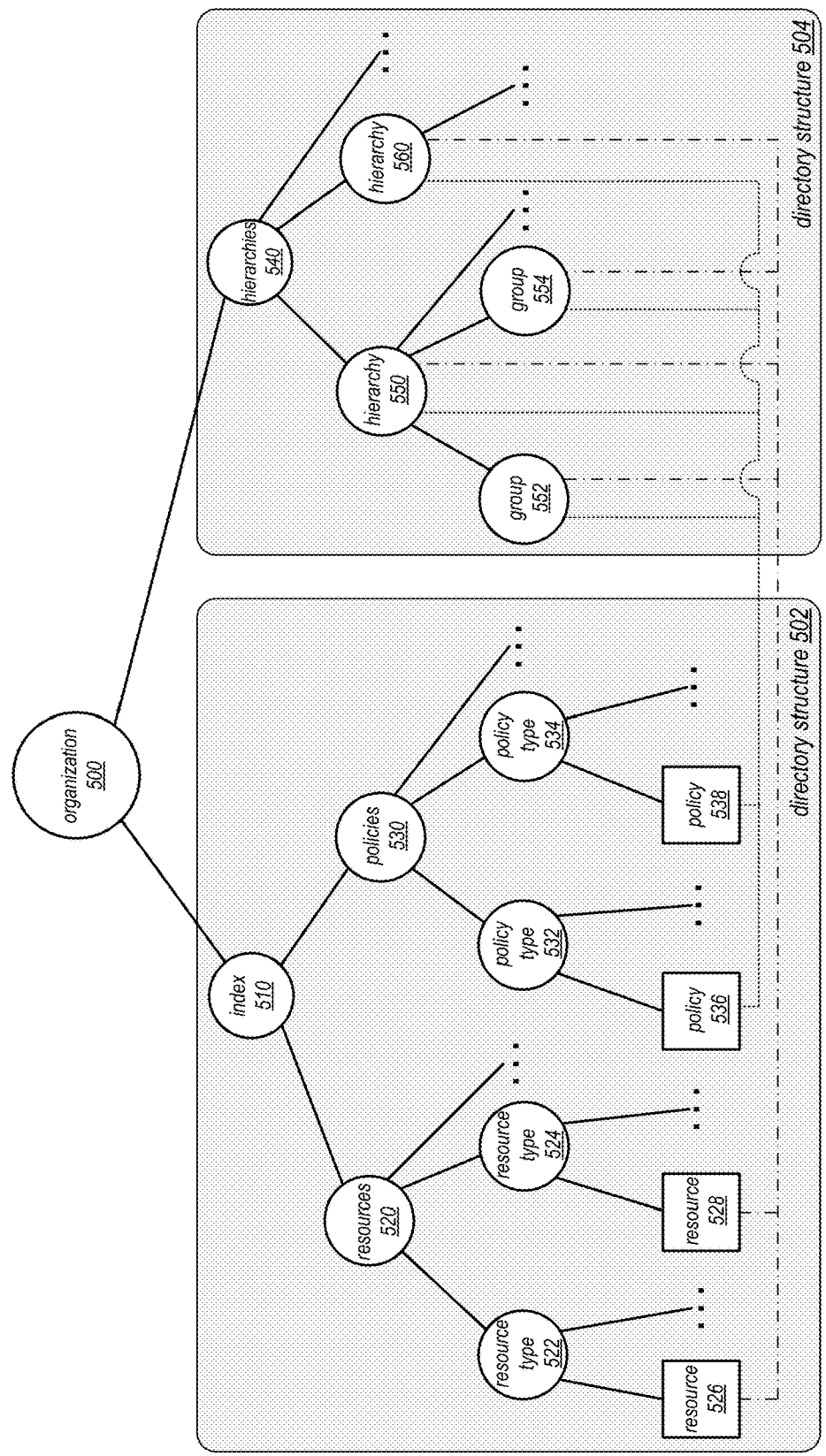
FIG. 5 is a logical illustration of directory structures that may store resource data objects and hierarchies of resource data objects in a hierarchical data store, according to some embodiments.

FIG. 5 is a logical illustration of directory structures that may store resource data objects and hierarchies of resource data objects in a hierarchical data store, according to some embodiments. Organization data objects (including policy data objects, resource data objects, groups or groups of groups of data objects) may be maintained in one or multiple directory structures, in various embodiments. For example, organization 500 may utilize directory structure 502 to store the resources and policies that are part of the organization. Index node 510 may provide information for performing a lookup to determine the location of a resource data object or policy data object. Resources node 520 may group resources into various resources types 522 and 524 (e.g., user accounts, virtual compute instances, storage volumes, VPNs, load balancers, etc.) and within the resource types 522 and 524 may be found resource data objects 526 and 528 describing individual resources in the provider network. Similarly, policies node 530 may include different policy types 532 and 534 (which may be created by clients as discussed above). Individual instances of the policy types 536 and 538 may be policy instances applied to resource data objects, groups, groups of groups, or hierarchies.

Organization 500 may also utilize directory structure 504 to maintain different hierarchies of resource data objects and policy data objects. Hierarchies node 540 may be the group of hierarchies maintained for organization 500, including hierarchy 550 and hierarchy 560. Within each hierarchy, groups, 552 and 554 or groups of groups, and/or any arrangement of resources included in the group of resources 520 may be linked (as illustrated by the dotted lines) to indicate membership in the group. Similar policies, such as policies 536 and 538 may be linked to hierarchies, groups or groups of groups, or individual resource data objects within the hierarchies.

Different types of hierarchical data structures, such as directory structures 502 and 504, may be stored, managed, and or represented in order to maintain organization 500. For example nodes in a hierarchy (e.g., the circle or square shapes) may have a globally unique identifier (GUID), zero or more attributes (key, value pairs), and zero or more links to other nodes. In some embodiments, a group or directory may be one type of node which has zero or more child links to other nodes, either groups/directories or resource data objects/policy data objects. Group nodes may have zero or one parent directory node, implying that directory nodes and links define a tree structure, in some embodiments, as depicted in FIG. 5. Index 510, hierarchies 540, resources 520, policies 530, hierarchy 550 and 560, resource type 522 and 524, policy type 532 and 534, and group 552 and 554 may be group/directory nodes. Node 500, organization node, may be a root node that is the logical root multiple directory structures and may not be visible to clients of resource management service (which may access individual hierarchies). Resource and policy nodes (represented by squares such as resource node) may be leaf nodes in a directory structure 410. Leaf nodes may have a unique external Id (e.g., client specified) and client-defined attributes. Leaf nodes can have more than one parent node so that resource data objects and policy data objects can be linked to multiple hierarchies. In some embodiments, all resource data objects are linked to all hierarchies (though in different arrangements as defined by a user), whereas in other embodiments, resource data objects may be linked to only some hierarchies.

In some embodiments, a link may be a directed edge between two nodes defining a relationship between the two nodes. There may be many types of links, such as client visible link types and another link type for internal hierarchical data store operation. In some embodiments, a child link type may create a parent-child relationship between the nodes it connects. For example, child link can connect resource type node 522 to resource 526. Child links may define the structure of directories (e.g., resources 520, policies 530, hierarchies 540). Child links may be named in order to define the path of the node that the link points to. Another type of client visible link may be an attachment link. An attachment link may apply a resource data object or policy data object to another node (e.g., group 552, hierarchy 550, etc.) as depicted by the dotted lines. Nodes can have multiple attachments. In some embodiments, some attachment restrictions may be enforced, such as a restriction that not more than one policy node (e.g., policy 536) of policy type 532 can be attached to a same node. A non-visible type of link or implied link type may also be implemented in some embodiments, a reverse link. Reverse links may be used for optimizing traversal of directory structures for common operations like look-ups (e.g., policy lookups).

In various embodiments, data objects or nodes in organization 500 can be identified and found by the pathnames that describe how to reach the node starting from the logical root node 500, starting with the link labeled "/" and following the child links separated by path separator "/" until reaching the desired node. For example, resource 526 can be identified using the path: "/index510/resources520/resource526". As some nodes may be children of multiple directory nodes, multiple paths may identify the node. For example, the following path can also be used to identify resource 526: "/hierarchies540/hierarchy550/group 552". Please note that the illustration in FIG. 5 provides many examples of the possible ways in which policy data objects or lease data objects may be linked. As noted earlier, not all policies may be attached to all hierarchies or all resource data objects to all hierarchies and thus the illustrated links are not intended to be limiting. Similar, directory structures may be differently arranged so that a single directory structure or a greater number of directory structures are utilized.

Figure 6:
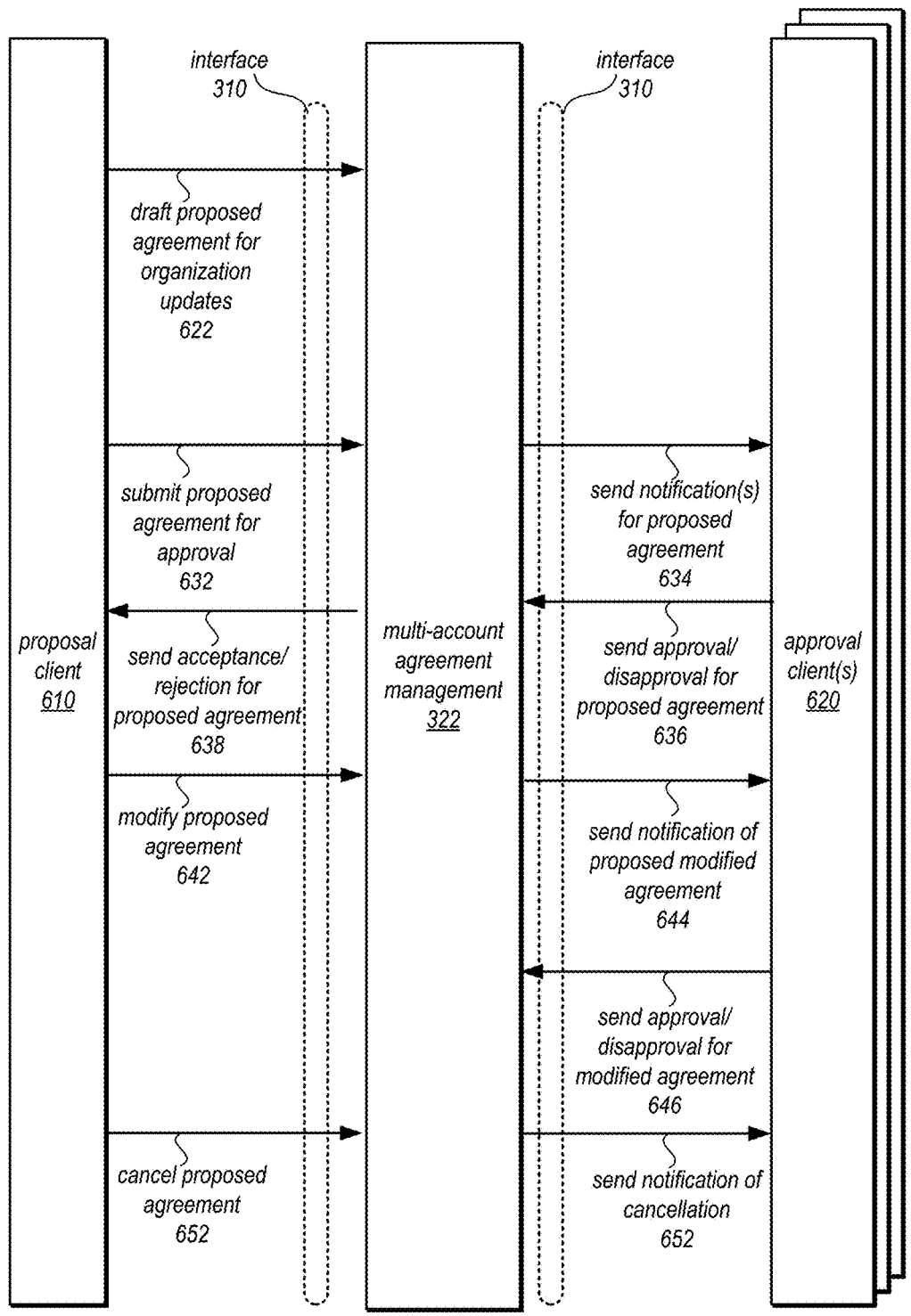
FIG. 6 illustrates interactions to submit agreement requests for updates to organizations, according to some embodiments.

As discussed above, some changes to organizations, including hierarchies, policies, and resource data objects may need to be approved and/or coordinated amongst multiple stakeholders. The multi-account agreement manager 322 discussed above may interact with clients to facilitate agreement requests that coordinate approval among multiple user accounts. FIG. 6 illustrates interactions to submit agreement requests for updates to organizations, according to some embodiments. Proposal client 610 may be one of clients 270 in FIG. 2 above that allows a user to interact with a resource management system that implements multi-account agreement management 322. Interface 310 may be a command line or graphical interface that formats requests according to a programmatic interface, such as API, multi-account agreement management 322. Client 610 may submit draft proposed agreement for organization updates request 622 via interface 310 to multi-account agreement management. Draft agreement 622 may include proposed updates that are user specified (e.g., updates by API commands, executable scripts, code or other executable instructions) or draft agreement 622 may be a request to propose a predefined set of updates (e.g., defined by resource management service 240, such as apply a policy, invite a user account to join an organization, launch a new provider network resource, etc.). Draft agreement 622 may include an authorization scheme that specifies approvers or a discovery mechanism for approvers (e.g., approver types, groups of possible user accounts that can approve, etc.). Changes can be made to the draft agreement request without triggering notifications to approvers. In some embodiments, agreement requests may be locked or otherwise unchangeable after submission 632.

Client 610 may submit a proposed agreement for approval 632 to multi-account agreement management 322. For example, submission request 632 may include an identifier for the draft proposed agreement request created above at 622. Note that in some embodiments, submission request 632 may be the initial and only submission to multi-account agreement management 322 (e.g., without first creating a draft agreement request) and thus may identify update(s) (and an authorization scheme) in some instances. Multi-account agreement management 322 may send notifications for the proposed agreement 634 via interface 310 to approval client(s) 620 (which may be clients 270 associated with user accounts identified as approvers). Approval client(s) 636 may send approval/disapproval responses for the proposed agreement 636 which multi-account agreement management 322 may evaluate for approval of the proposed agreement according to the authorization scheme for the agreement request and send a response indicating acceptance or rejection of the proposed agreement 638.

In at least some embodiments, client 610 may submit a modification to the proposed agreement 642. The modification may be a modification to the authorization scheme or the updates to be performed. In some scenarios (e.g., where changes to the updates are made), notifications of the proposed modification to the agreement 644 may be sent to approval client(s) 620. As noted above, approval client(s) 620 may send approval/disapproval response for the modified agreement 646.

In at least some embodiments, proposal client 610 may cancel the proposed agreement 652. In response, multi-account agreement management 322 may send notifications of cancellation 652 to approval client(s) 620 and/or may ignore responses received from approval client(s) 620 for the cancelled agreement request.

Figure 7:
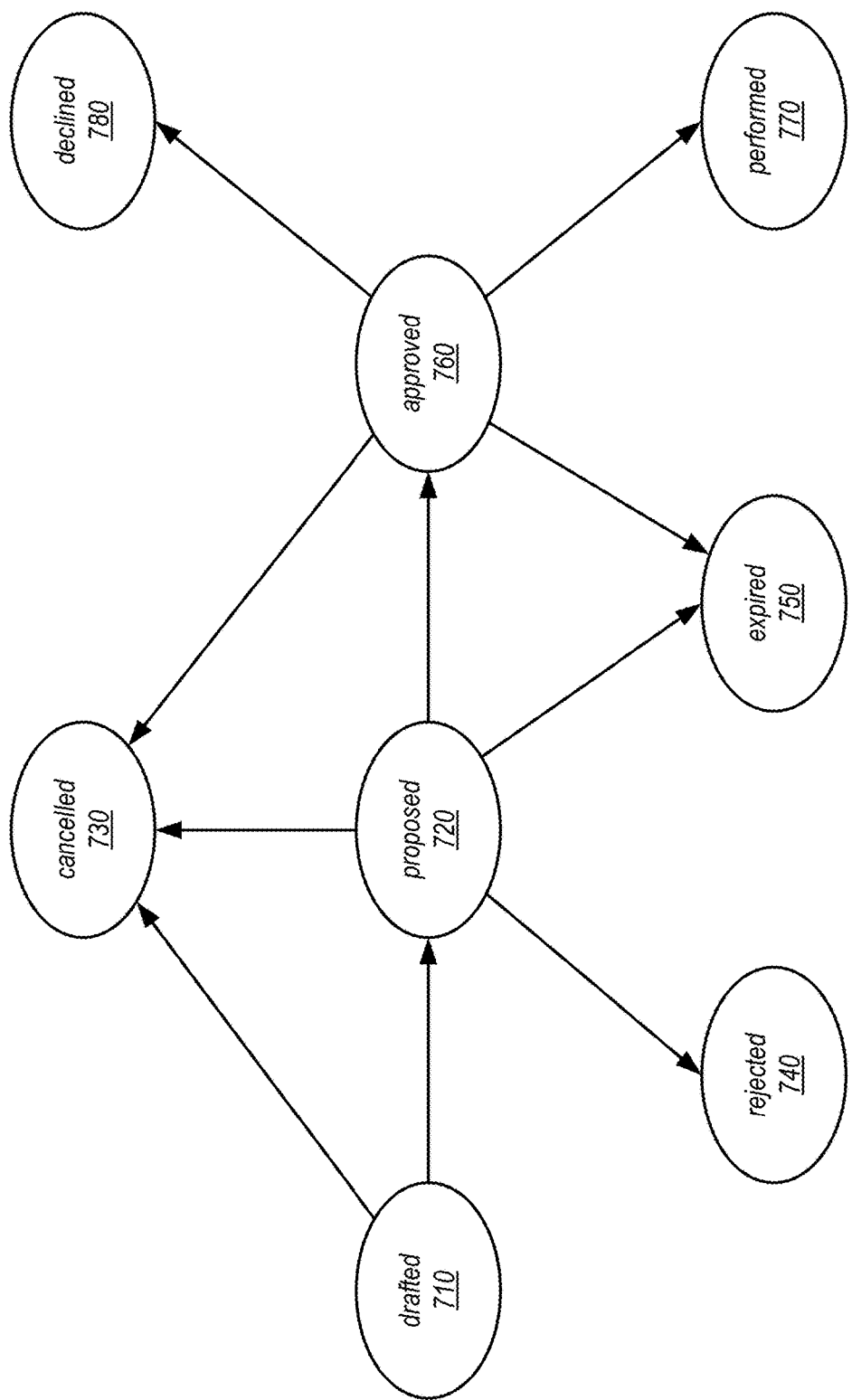
FIG. 7 illustrates a state diagram for agreement requests, according to some embodiments.

As noted above, multi-account agreement management 322 may track the state of pending or outstanding agreement requests as well as previously performed or rejected agreement requests. FIG. 7 illustrates a state diagram for agreement requests, according to some embodiments. As noted above in FIG. 7, an agreement request may be initially enter a draft state 710. Draft state 710 may indicate that a proposing user account can add, change, or modify the agreement request. As illustrated in FIG. 7, a draft agreement request can be cancelled, moving the agreement request to cancelled state 730. Alternatively, if the agreement request is finalized and submitted, then the agreement request may enter proposed state 720. From proposed state 720, an agreement request can enter rejected state 740 as a result of failing to satisfy the authorization scheme. Similarly, the agreement request may enter expired state 750 as a result of failing to be approved before expiration conditions are satisfied (e.g., a within an expiration time limit).

While in proposed state 720, notifications for the agreement request may be provided, responses received and evaluated. If the authorization scheme for the agreement request is satisfied, then as illustrated in FIG. 7, the agreement request may enter the approved state 760. In some embodiments, once an agreement request is approved, then the proposed updates may be automatically directed, initiated, or otherwise performed. However, in some embodiments, as illustrated in FIG. 7, approved agreement requests may still enter decline state 780. For example, if the agreement request is an invitation to add a new user account to an organization, then the invited user account may decline the invitation to join the organization. In some embodiments, the proposer may abort the approved agreement request if, for instance, another change to the distributed system renders the proposed changes undesirable, as indicated by the change from approved state 760 to cancelled state 730. Similarly, a time period for execution of the proposed changes may be monitored and if the updates are not performed prior to the expiration of the time period, the agreement request may move from approved state 760 to expired state 750. If, however, the proposed changes are performed and/or successfully completed, then the performed state 770 may be entered.

Figure 8:
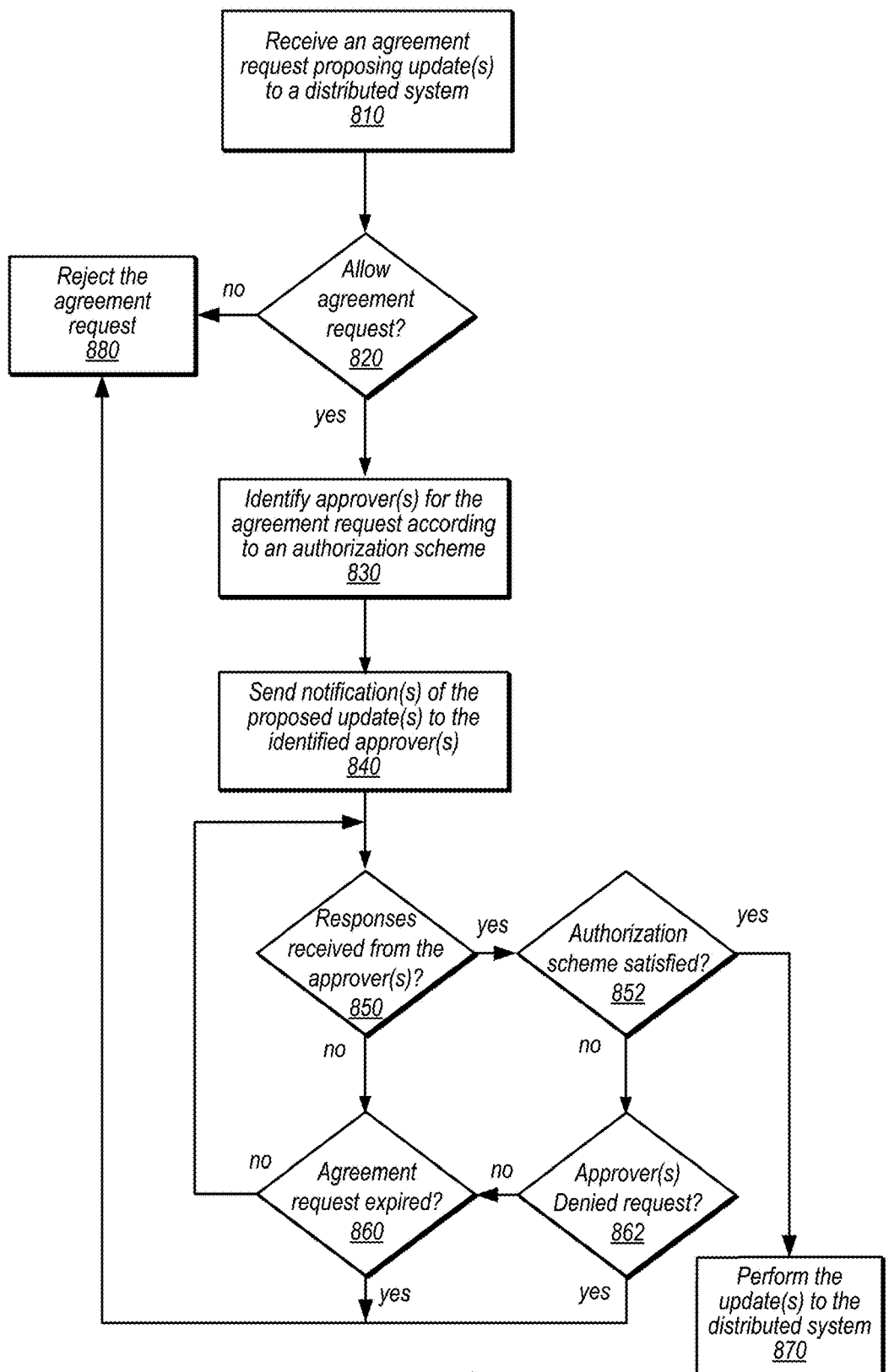
FIG. 8 is a high-level flowchart illustrating methods and techniques to implement multi-party updates to a distributed system, according to some embodiments.

Although FIGS. 2-7 have been described and illustrated in the context of a provider network implementing a resource management service for resources of multiple different services in the provider network, the various components illustrated and described in FIGS. 2-7 may be easily applied to other resource management systems, components, or devices for distributed systems. For example, control planes for data storage services, configuration management systems for apply changes to systems, or other managers or controllers for distributed systems. As such, FIGS. 2-7 are not intended to be limiting as to other embodiments of a system that may implement resource management system for system resources. FIG. 8 is a high-level flowchart illustrating methods and techniques to implement multi-party updates to a distributed system, according to some embodiments. Various different systems and devices may implement the various methods and techniques described below, either singly or working together. For example, a resource management service such as described above with regard to FIGS. 2-7 may be configured to implement the various methods. Alternatively, a combination of different systems and devices may implement these methods. Therefore, the above examples and or any other systems or devices referenced as performing the illustrated method, are not intended to be limiting as to other different components, modules, systems, or configurations of systems and devices.

As indicated at 810, an agreement request proposing one or more updates to a distributed system may be received. The agreement request may be specified according to an interface, such as API, and may include various other executable instructions, such as API requests indicating the proposed updates to the distributed system. For example, the agreement request may include requests to add a resource data object (e.g., user account or resource) to a group in a hierarchy by including an AddToGroup request in the agreement request. In some embodiments, however, other representations of updates may be included. For example, executable instructions, such as code, scripts, or other executable data objects may describe the updates to perform with respect to the distributed system.

Updates to a distributed system may include any changes to the number, arrangement, configuration, execution, operation, access, management, or any other modification to the distributed system. In some embodiments, updates may be updates to a hierarchy of resource data objects, such as an organization discussed above with regard to FIG. 5 that manage the resources of a distributed system, such as updates to invite user accounts of a provider network to join the organization (e.g., by adding a corresponding resource data object to the organization including information describing the user account and applying policies to the user account dependent upon the location, such as the group assignment, of the user account in the organization) or to apply or attach policies to groups or data objects. If multiple updates are indicated in the agreement request, the updates may describe different types of updates, such as updates to the organization and updates to add, launch, modify, halt, or create a new resource (e.g., a virtual compute instance or data storage volume) in the provider network in the same agreement request. In some embodiments, updates may be a request to execute a function, operation, task, workflow, or action defined and/or execute by a different resource in the distributed system than the resource (e.g., agreement manager) determining whether agreement is reached to perform the update. For instance, a network-based service implemented as part of a provider network may execute user-specified functions upon invocation by an API call to the service, which would allow an update to describe the API call to the service which in turn invokes execution of a function.

An authorization scheme for the received agreement request may be determined, in various embodiments. For instance, the agreement request may specify, identify, or otherwise comprise the authorization scheme. Consider that various available authorization schemes may be implemented by an agreement manager, which may be selected for processing an agreement request that identifies the determined one of the multiple authorization schemes. In some embodiments, the determined authorization scheme may be defined or specified in the agreement request. For example, the determined authorization scheme may be defined to include one or multiple satisfaction criteria for determining whether the proposed updates in the agreement request are approved. The determined authorization scheme may also include the identity of approvers (e.g., by identifying user account names or other user account identifiers), or a mechanism for determining approvers (e.g.; by identifying user account types or groups that include user accounts any of which may act as an approver).

Authorization schemes may be implemented in different ways. For example, a nuclear key authorization scheme may be implemented that identifies an exact number of entities (e.g., user accounts) as well as the identity of specific entities (e.g., specific user accounts) that may approve the proposed changes, Consider a scenario where the authorization scheme includes a requirement that 3 user accounts must each approve the proposed updates (e.g., user account A and user account B and user account C). If only two of the three user accounts (e.g., B and C) approve of the proposed updates, then the agreement request cannot satisfy the requirement, even if another user account, user account D, where to approve the proposed updates. In some embodiments; quorum-based approval techniques may be implemented as an authorization scheme so that a minimum number of approvers approve of the proposed updates (even if all approvers do not approve of the proposed amendments). A quorum-based requirement for an authorization policy, for example, may require that 3 of 5 identified approvers provide approval for the proposed updates. Another type of authorization requirement may be a veto-based requirement that allows for authorization of the proposed updates as long as none of the identified approvers (or a quorum of identified approvers) veto or otherwise reject the proposed updates within a certain time period (e.g., 24 hours).

Authorization schemes may include multiple requirements, in some embodiments. For example, an authorization scheme may include a requirement that a particular approver must approve the proposed updates and that at least one approver from multiple different groups of other approvers approve the proposed updates. An authorization scheme, for instance, could specify that a user account of a particular organization leader (e.g., manager, director, vice-president, etc.) approve of the updates and that 1 user account from a human resources (HR) group and 1 user account from a security group approve of the updates (combining quorum requirements with a specific approver requirement).

As indicated at 820, in response to receiving the request a determination may be made as to whether the agreement request is to proceed. For example, agreement requests may be limited by a throttling scheme imposed upon agreement requests submitted by a single user account, or a total number of agreement requests that may be outstanding (e.g., not yet approved or rejected) in a given time period. If a request from a user account exceeds a limit or threshold on the number agreement requests that can be outstanding or submitted for a user account in a time period, then as indicated by the negative exit from 820, the agreement request may be rejected. Agreement requests may also not be allowed to proceed if resulting in duplicate updates. For example, data describing outstanding or completed updates to a distributed system may be performed. When the agreement request is received, a comparison of the described updates with the updates of the outstanding and/or past agreement requests may be made. If, the proposed updates match one of the outstanding or past agreement requests, then the agreement request may be identified as a duplicate agreement request and rejected, as indicated at 880.

As indicated at 830, approver(s) for the agreement request may be identified according to the authorization scheme for the request, in various embodiments. If the authorization scheme identifies specific approvers (e.g., specific user account ids or user names), then the identity of the approvers may be determined by accessing the authorization scheme. In some embodiments, the authorization scheme may provide a discovery mechanism to determine the approvers. For example, the authorization scheme may provide an attribute, condition, or other signature that can be compared with possible users to determine which users may be approvers. Consider the scenario where the authorization scheme describes that the approvers must be user accounts associated with a particular team, organization, or department. The authorization request may specify that any user account associated with the team, organization or department may be an approver for the agreement request. In some embodiments, the requested updates may identify one, some, or all of the approvers. For instance, if the update is an update to the user account itself (e.g., changing group membership or joining an organization), then the approver may be the user account identified by the update.

As indicated at 840, notifications of the proposed update(s) may be sent to the identified approver(s), in some embodiments. For example, notifications may include plain text descriptions of proposed updates (e.g., plain text descriptions of included API calls, scripts, or executable data objects that are not human readable). Notifications may also identify other approvers, expiration times (e.g., an approval deadline), the user account proposing the updates, and/or any other information that an approver may need to determine whether or not to approve the proposed updates. Notifications may be sent via network communications to a client that is associated with the user account of the approver (e.g., send an approval email to a computer providing access to an email address associated with the user account, a message or communication portal, window, or display provided to the user account when the user account logs onto a network-based site, such as a user control panel provided as part of a service or provider network interface). Responses of approval or disapproval may be sent back via the same communication or notification channel (e.g., via the same interface) or via a different communication channel. For example, an email or text notification sent via mail protocol or messaging protocol may include a link to a web interface, which can display approval or disapproval response controls so that the response is sent via network communication via the web interface. Note that in some embodiments, notifications of proposed update(s) may not be sent to approvers. Instead, approvers may poll for periodically (or randomly request) a list of proposed updates for which the approver has been identified from an agreement manager, such as multi-account agreement management 322.

Agreement requests may be asynchronously processed, in various embodiments. Once notifications are sent to approvers, approval (or disapproval) responses may be processed as received until the proposed changes are approved according to the authorization scheme, disapproved, or expired. As indicated by the positive exit from 850, when response(s) are received from the approver(s), a determination may be made as to whether the authorization scheme is satisfied, as indicated at 852. Response data, such as the responding approver and the answer (e.g., approve or disapprove) may be maintained so that as responses for agreement requests arrive at different times, as well as data indicating those authorization requirements satisfied and outstanding so that an evaluation of the authorization scheme may be performed as requests are received. For example, quorum requirements may provide more notifications to approvers than may be required to satisfy the quorum, therefore once a quorum requirement is satisfied, the quorum requirement may be marked or stored as satisfied so that responses received from additional approvers in the quorum can be ignored for authorization scheme evaluation purposes.

The authorization scheme may not be satisfied by received responses, either because as indicated at 862, enough approver(s) have disapproved the request so that the authorization cannot be satisfied, and the agreement request is rejected, as indicated by the positive exit from 862. If, however, the received responses neither satisfy, and thus approve the agreement request or disqualify the agreement request, then as indicated by the negative exit from 862, processing of the agreement request may continue. In at least some embodiments, agreement request may be subject to a default time expiration threshold (or an expiration threshold or condition defined by the authorization scheme). If no responses are received, as indicated by the negative exit from 850, and a sufficient amount of time since the notifications of the agreement request has passed (or time since the submission of the agreement request at 810), then the agreement request may be expired, as indicated by the positive exit from 860, and the agreement request rejected, as indicated at 880. For example, a 24 hour approval expiration date may deny agreement requests not approved within 24 hours of submission. If, however, the agreement request is not yet expired, then as indicated by the negative exit from 860, the agreement request may remain outstanding or pending, waiting for approval or disapproval.

As indicated at 870, the proposed updates of an agreement scheme that is approved according to the authorization scheme may be performed to the distributed system. For example, the described API requests may be sent, the included script parsed and executed, or the executable data executed.

In at least some embodiments, changes to the authorization scheme, including changes to approvers can be made after submitting the agreement request. For example, a user may wish to add an additional approver (e.g., so that the additional approver is aware of the change). In response to the change in authorization scheme, a notification may be sent to the additional approver. In the event that authorization changes remove approver(s), responses received from the removed approvers may be ignored for determining whether the authorization scheme is satisfied. In addition to changes to the authorization scheme, changes to the proposed updates may be made, in some embodiments. For example, update(s) may be added, removed, or modified for the agreement request. In response to changes to the proposed updates, updated notifications may be sent to approvers so that the approvers can approve the changed proposed updates.

The methods described herein may in various embodiments be implemented by any combination of hardware and software. For example, in one embodiment, the methods may be implemented by a computer system (e.g., a computer system as in FIG. 9) that includes one or more processors executing program instructions stored on a computer-readable storage medium coupled to the processors. The program instructions may be configured to implement the functionality described herein (e.g., the functionality of various servers and other components that implement the directory storage service and/or storage services/systems described herein). The various methods as illustrated in the figures and described herein represent example embodiments of methods. The order of any method may be changed, and various elements may be added, reordered, combined, omitted, modified, etc.

Figure 9:
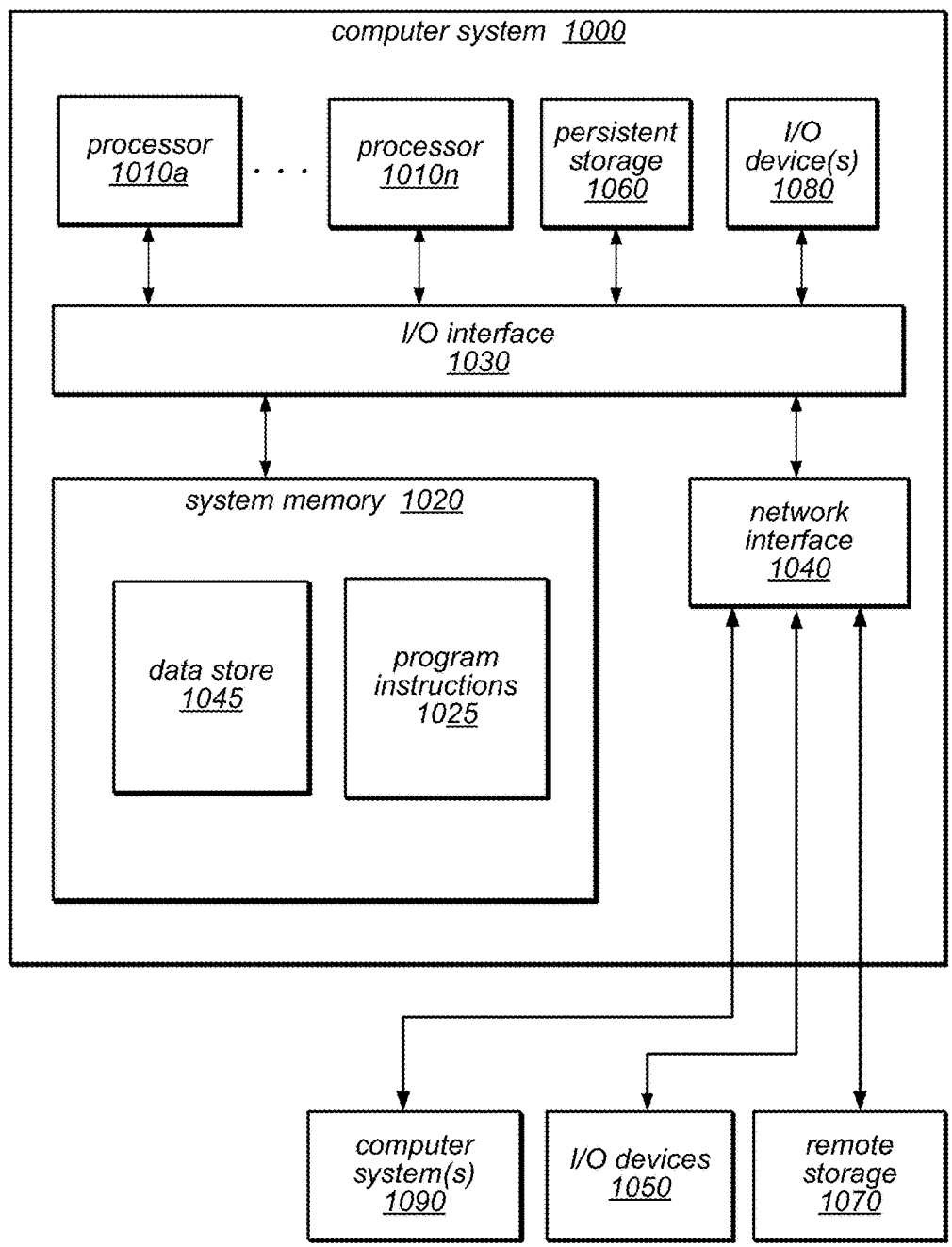
FIG. 9 is an example computer system, according to various embodiments.

FIG. 9 is a block diagram illustrating a computer system configured to implement multi-party updates to a distributed system, according to various embodiments, as well as various other systems, components, services or devices described above. For example, computer system 1000 may be configured to implement various components of a resource management service, hierarchical data store, or other provider network services, in different embodiments. Computer system 1000 may be any of various types of devices, including, but not limited to, a personal computer system, desktop computer, laptop or notebook computer, mainframe computer system, handheld computer, workstation, network computer, a consumer device, application server, storage device, telephone, mobile telephone, or in general any type of computing device.

Computer system 1000 includes one or more processors 1010 (any of which may include multiple cores, which may be single or multi-threaded) coupled to a system memory 1020 via an input/output (I/O) interface 1030. Computer system 1000 further includes a network interface 1040 coupled to I/O interface 1030. In various embodiments, computer system 1000 may be a uniprocessor system including one processor 1010, or a multiprocessor system including several processors 1010 (e.g., two, four, eight, or another suitable number). Processors 1010 may be any suitable processors capable of executing instructions. For example, in various embodiments, processors 1010 may be general-purpose or embedded processors implementing any of a variety of instruction set architectures (ISAs), such as the x86, PowerPC, SPARC, or MIPS ISAs, or any other suitable ISA. In multiprocessor systems, each of processors 1010 may commonly, but not necessarily, implement the same ISA. The computer system 1000 also includes one or more network communication devices (e.g., network interface 1040) for communicating with other systems and/or components over a communications network (e.g. Internet, LAN, etc.). For example, a client application executing on system 1000 may use network interface 1040 to communicate with a server application executing on a single server or on a cluster of servers that implement one or more of the components of the directory storage systems described herein. In another example, an instance of a server application executing on computer system 1000 may use network interface 1040 to communicate with other instances of the server application (or another server application) that may be implemented on other computer systems (e.g., computer systems 1090).

In the illustrated embodiment, computer system 1000 also includes one or more persistent storage devices 1060 and/or one or more I/O devices 1080. In various embodiments, persistent storage devices 1060 may correspond to disk drives, tape drives, solid state memory, other mass storage devices, or any other persistent storage device. Computer system 1000 (or a distributed application or operating system operating thereon) may store instructions and/or data in persistent storage devices 1060, as desired, and may retrieve the stored instruction and/or data as needed. For example, in some embodiments, computer system 1000 may host a storage system server node, and persistent storage 1060 may include the SSDs attached to that server node.

Computer system 1000 includes one or more system memories 1020 that are configured to store instructions and data accessible by processor(s) 1010. In various embodiments, system memories 1020 may be implemented using any suitable memory technology, (e.g., one or more of cache, static random access memory (SRAM), DRAM, RDRAM, EDO RAM, DDR 10 RAM, synchronous dynamic RAM (SDRAM), Rambus RAM, EEPROM, non-volatile/Flash-type memory, or any other type of memory). System memory 1020 may contain program instructions 1025 that are executable by processor(s) 1010 to implement the methods and techniques described herein. In various embodiments, program instructions 1025 may be encoded in platform native binary, any interpreted language such as Java™ byte-code, or in any other language such as C/C++, Java™, etc., or in any combination thereof. For example, in the illustrated embodiment, program instructions 1025 include program instructions executable to implement the functionality of a hierarchy storage nodes that maintain versions of hierarchical data structures or components of a transaction log store that maintain transaction logs for hierarchical data structures, in different embodiments. In some embodiments, program instructions 1025 may implement multiple separate clients, server nodes, and/or other components.

In some embodiments, program instructions 1025 may include instructions executable to implement an operating system (not shown), which may be any of various operating systems, such as UNIX, LINUX, Solaris™, MacOS™, Windows™, etc. Any or all of program instructions 1025 may be provided as a computer program product, or software, that may include a non-transitory computer-readable storage medium having stored thereon instructions, which may be used to program a computer system (or other electronic devices) to perform a process according to various embodiments. A non-transitory computer-readable storage medium may include any mechanism for storing information in a form (e.g., software, processing application) readable by a machine (e.g., a computer). Generally speaking, a non-transitory computer-accessible medium may include computer-readable storage media or memory media such as magnetic or optical media, e.g., disk or DVD/DIRECTORY STORAGE SERVICE 220-ROM coupled to computer system 1000 via I/O interface 1030. A non-transitory computer-readable storage medium may also include any volatile or non-volatile media such as RAM (e.g. SDRAM, DDR SDRAM, RDRAM, SRAM, etc.), ROM, etc., that may be included in some embodiments of computer system 1000 as system memory 1020 or another type of memory. In other embodiments, program instructions may be communicated using optical, acoustical or other form of propagated signal (e.g., carrier waves, infrared signals, digital signals, etc.) conveyed via a communication medium such as a network and/or a wireless link, such as may be implemented via network interface 1040.

In some embodiments, system memory 1020 may include data store 1045, which may be configured as described herein. For example, the information described herein as being stored by the hierarchy storage nodes or transaction log store described herein may be stored in data store 1045 or in another portion of system memory 1020 on one or more nodes, in persistent storage 1060, and/or on one or more remote storage devices 1070, at different times and in various embodiments. In general, system memory 1020 (e.g., data store 1045 within system memory 1020), persistent storage 1060, and/or remote storage 1070 may store data blocks, replicas of data blocks, metadata associated with data blocks and/or their state, database configuration information, and/or any other information usable in implementing the methods and techniques described herein.

In one embodiment, I/O interface 1030 may be configured to coordinate I/O traffic between processor 1010, system memory 1020 and any peripheral devices in the system, including through network interface 1040 or other peripheral interfaces. In some embodiments, I/O interface 1030 may perform any necessary protocol, timing or other data transformations to convert data signals from one component (e.g., system memory 1020) into a format suitable for use by another component (e.g., processor 1010). In some embodiments, I/O interface 1030 may include support for devices attached through various types of peripheral buses, such as a variant of the Peripheral Component Interconnect (PCI) bus standard or the Universal Serial Bus (USB) standard, for example. In some embodiments, the function of I/O interface 1030 may be split into two or more separate components, such as a north bridge and a south bridge, for example. Also, in some embodiments, some or all of the functionality of I/O interface 1030, such as an interface to system memory 1020, may be incorporated directly into processor 1010.

Network interface 1040 may be configured to allow data to be exchanged between computer system 1000 and other devices attached to a network, such as other computer systems 1090 (which may implement embodiments described herein), for example. In addition, network interface 1040 may be configured to allow communication between computer system 1000 and various I/O devices 1050 and/or remote storage 1070. Input/output devices 1050 may, in some embodiments, include one or more display terminals, keyboards, keypads, touchpads, scanning devices, voice or optical recognition devices, or any other devices suitable for entering or retrieving data by one or more computer systems 1000. Multiple input/output devices 1050 may be present in computer system 1000 or may be distributed on various nodes of a distributed system that includes computer system 1000. In some embodiments, similar input/output devices may be separate from computer system 1000 and may interact with one or more nodes of a distributed system that includes computer system 1000 through a wired or wireless connection, such as over network interface 1040. Network interface 1040 may commonly support one or more wireless networking protocols (e.g., Wi-Fi/IEEE 802.11, or another wireless networking standard). However, in various embodiments, network interface 1040 may support communication via any suitable wired or wireless general data networks, such as other types of Ethernet networks, for example. Additionally, network interface 1040 may support communication via telecommunications/telephony networks such as analog voice networks or digital fiber communications networks, via storage area networks such as Fibre Channel SANs, or via any other suitable type of network and/or protocol. In various embodiments, computer system 1000 may include more, fewer, or different components than those illustrated in FIG. 9 (e.g., displays, video cards, audio cards, peripheral devices, other network interfaces such as an ATM interface, an Ethernet interface, a Frame Relay interface, etc.)

It is noted that any of the distributed system embodiments described herein, or any of their components, may be implemented as one or more network-based services. For example, a database engine head node within the database tier of a database system may present database services and/or other types of data storage services that employ the distributed storage systems described herein to clients as network-based services. In some embodiments, a network-based service may be implemented by a software and/or hardware system designed to support interoperable machine-to-machine interaction over a network. A network-based service may have an interface described in a machine-processable format, such as the Web Services Description Language (WSDL). Other systems may interact with the network-based service in a manner prescribed by the description of the network-based service's interface. For example, the network-based service may define various operations that other systems may invoke, and may define a particular application programming interface (API) to which other systems may be expected to conform when requesting the various operations.

In various embodiments, a network-based service may be requested or invoked through the use of a message that includes parameters and/or data associated with the network-based services request. Such a message may be formatted according to a particular markup language such as Extensible Markup Language (XML), and/or may be encapsulated using a protocol such as Simple Object Access Protocol (SOAP). To perform a network-based services request, a network-based services client may assemble a message including the request and convey the message to an addressable endpoint (e.g., a Uniform Resource Locator (URL)) corresponding to the network-based service, using an Internet-based application layer transfer protocol such as Hypertext Transfer Protocol (HTTP).

In some embodiments, network-based services may be implemented using Representational State Transfer ("RESTful") techniques rather than message-based techniques. For example, a network-based service implemented according to a RESTful technique may be invoked through parameters included within an HTTP method such as PUT, GET, or DELETE, rather than encapsulated within a SOAP message.

The various methods as illustrated in the figures and described herein represent example embodiments of methods. The methods may be implemented manually, in software, in hardware, or in a combination thereof. The order of any method may be changed, and various elements may be added, reordered, combined, omitted, modified, etc.

Although the embodiments above have been described in considerable detail, numerous variations and modifications may be made as would become apparent to those skilled in the art once the above disclosure is fully appreciated. It is intended that the following claims be interpreted to embrace all such modifications and changes and, accordingly, the above description to be regarded in an illustrative rather than a restrictive sense.

What is claimed is:
1. A system, comprising:
a plurality of compute nodes, comprising at least one processor and a memory that implement a distributed system, wherein the distributed system is operated on behalf of a plurality of user accounts,
wherein one or more of the compute nodes implement an agreement manager for performance of updates to the distributed system; and
the agreement manager, configured to:
receive, via an interface for the distributed system, an agreement request from one of the user accounts that proposes one or more updates to the distributed system;
responsive to the agreement request:
determine an authorization scheme for authorization of the proposed updates;
identify one or more other ones of the user accounts as approvers for the agreement request according to the authorization scheme;
provide, via the interface, respective notifications of the proposed updates for approval, to the identified user accounts;
receive, via the interface, corresponding responses from at least one of the identified user accounts;
evaluate the one or more responses to determine whether the authorization scheme for the agreement request is satisfied;
determine that the authorization scheme for the agreement request is satisfied based at least in part on the evaluation; and responsive to the determination that the authorization scheme is satisfied, direct performance of the one or more updates to the distributed system.

2. The system of claim 1, wherein the agreement request identifies the authorization scheme for the agreement request, and wherein to determine the authorization scheme, the agreement manager is configured to parse the agreement request to discover the identified authorization scheme.

3. The system of claim 1, wherein the authorization scheme comprises a requirement that the at least one user account approve of the proposed updates.

4. The system of claim 1, wherein the distributed system is a provider network, wherein the updates describe updates to a hierarchical data structure maintained for the provider network comprising a plurality of resource data objects that identify policies applicable to the behavior of resources implemented at one or more network-based services in the provider network corresponding to the resource data objects.

5. A method, comprising:
performing, by one or more computing devices:
receiving an agreement request associated with a user account proposing one or more updates to a hierarchical data structure comprising a plurality of resource data objects that identify policies applicable to the behavior of resources corresponding to the resource data objects in the distributed system;
responsive to the agreement request:
identifying, from other user accounts of the distributed system that are different than the user account, one or more approvers for the agreement request according to an authorization scheme for the agreement request to provide respective notifications of the proposed one or more updates;
evaluating one or more responses received from at least one of the approvers to determine whether the authorization scheme for the agreement request is satisfied;
determining, based on the evaluating, that the authorization scheme for the agreement request is satisfied; and
responsive to determining that the authorization scheme is satisfied, performing the one or more updates to the hierarchical data structure.

6. The method of claim 5, wherein the agreement request identifies the authorization scheme for the agreement request.

7. The method of claim 5, wherein the authorization scheme comprises a requirement that the at least one approver approve of the proposed updates.

8. The method of claim 5, wherein the authorization scheme comprises one or more quorum requirements for the identified approvers, and wherein evaluating the one or more responses received from the at least one user account identified for approval comprises verifying that the responses indicate approval of a respective minimum number of approvers identified for the one or more quorum requirements.

9. The method of claim 5, further comprising:
prior to evaluating the one or more responses, receiving a request to modify the authorization scheme for the agreement request, wherein the evaluation of the one or more response determines whether the modified authorization scheme is satisfied.

10. The method of claim 5, further comprising:
receiving another agreement request proposing one or more other updates to the hierarchical data structure;
identifying one or more other approvers for the other agreement request according to a different authorization scheme for the other agreement request;
sending other respective notifications of the other proposed updates to the other identified approvers;
evaluating one or more other responses received from at least one of the other approvers to determine that the different authorization scheme for the other agreement request is not satisfied; and
determining that the different authorization scheme for the other agreement request is not satisfied; and
rejecting the other agreement request.

11. The method of claim 5, further comprising:
receiving another agreement request proposing one or more other updates to the hierarchical data structure;
identifying one or more other approvers for the other agreement request according to a different authorization scheme for the other agreement request;
sending other respective notifications of the other proposed updates to the other identified approvers;
determining that an expiration time limit to authorize the other agreement request is expired; and
rejecting the other agreement request.

12. The method of claim 5, further comprising:
receiving another agreement request proposing one or more other updates to the hierarchical data structure;
determining that the other agreement request is a duplicate of a prior agreement request that has been received; and
rejecting the other agreement request.

13. The method of claim 5, wherein the distributed system is a provider network, wherein the resources implemented as part of one or more network-based services in the provider network, and wherein the agreement request and the responses are received via an interface of the provider network.

14. A non-transitory, computer-readable storage medium, storing program instructions that when executed by one or more computing devices cause the one or more computing devices to implement:
receiving an agreement request proposing one or more updates to a distributed system, wherein the distributed system is operated on behalf of a plurality of user accounts, wherein the plurality of user accounts correspond to resource data objects in a hierarchical data structure describing the user accounts for the distributed system, wherein the agreement request is received from one of the user accounts;
responsive to the agreement request:
identifying one or more other ones of the user accounts as approvers for the agreement request according to an authorization scheme for the agreement request;
providing respective notifications of the proposed updates to the approvers;
evaluating one or more responses received from at least one of the user accounts identified as approvers to determine whether the authorization scheme for the agreement request is satisfied;
determining, based on the evaluating, that the authorization scheme for the agreement request is satisfied; and
responsive to determining that the authorization scheme is satisfied, directing performance of the one or more updates to the distributed system.

15. The non-transitory, computer-readable storage medium of claim 14, wherein the agreement request comprises one or more instructions to perform the one or more updates to the distributed system and wherein directing performance of the one or more updates to the distributed system comprises executing the one or more instructions in the agreement request.

16. The non-transitory, computer-readable storage medium of claim 14, wherein the authorization scheme comprises one or more quorum requirements for the identified approvers, and wherein, in evaluating the one or more responses received from the at least one user account identified for approval, the program instructions cause the one or more computing devices to implement verifying that the responses indicate approval of a respective minimum number of approvers identified for the one or more quorum requirements.

17. The non-transitory, computer-readable storage medium of claim 16, wherein the hierarchical data structure identifies different groups of user accounts for the plurality of user accounts, and wherein the one or more quorum requirements correspond to different ones of the groups of user accounts.

18. The non-transitory, computer-readable storage medium of claim 14, wherein the program instructions cause the one or more computing devices to further implement:
   prior to evaluating the responses, receiving a request to modify the identified approvers for the agreement request, wherein the evaluation of the at least one response determines whether the authorization scheme is satisfied based on whether at least one of the responses is received from one of the modified identified approvers.

19. The non-transitory, computer-readable storage medium of claim 14, wherein the program instructions cause the one or more computing devices to further implement:
   receiving another agreement request proposing one or more other updates to the distributed system;
   determining that the other agreement request exceeds an agreement request rate threshold for the one user account; and
   rejecting the other agreement request.

20. The non-transitory, computer-readable storage medium of claim 14, wherein the distributed system is a provider network, wherein the updates describe updates to a hierarchical data structure maintained for the provider network comprising a plurality of resource data objects that identify policies applicable to the behavior of resources implemented at one or more network-based services in the provider network corresponding to the resource data objects, and wherein the agreement request and the responses are received via an interface of the provider network.

* * * * *